United States Patent [19]

Holmin

[11] Patent Number: 5,569,118
[45] Date of Patent: Oct. 29, 1996

[54] TORQUE RESPONSIVE RELEASE CLUTCH MECHANISM

[75] Inventor: Mats C. Holmin, Stockholm, Sweden

[73] Assignee: Atlas Copco Tools AB, Nacka, Sweden

[21] Appl. No.: 360,949

[22] Filed: Dec. 21, 1994

[30]   Foreign Application Priority Data

Dec. 23, 1993 [SE]   Sweden ................... 9304278

[51] Int. Cl.⁶ .............................................. F16D 43/206
[52] U.S. Cl. ................... 477/178; 192/54.52; 192/56.57; 192/150; 173/178
[58] Field of Search .................... 477/178; 192/54.52, 192/56.57, 56.5, 56.62, 150; 173/178

[56]   References Cited

U.S. PATENT DOCUMENTS

| | | |
|---|---|---|
| 2,683,512 | 11/1949 | Boice . |
| 3,205,986 | 9/1965 | Kramer ................... 192/150 |
| 3,487,901 | 11/1967 | Kulman . |
| 4,842,078 | 6/1989 | Hansson ................... 192/150 |
| 4,951,756 | 8/1990 | Everett et al. .................. 192/150 |
| 5,129,465 | 7/1992 | Rahm ..................... 173/178 |

FOREIGN PATENT DOCUMENTS 1432978   6/1966   France .

Primary Examiner—Charles A. Marmor
Assistant Examiner—Sherry Lynn Estremsky
Attorney, Agent, or Firm—Frishauf, Holtz, Goodman, Langer & Chick

[57]   ABSTRACT

A torque responsive release clutch mechanism for a pneumatic power nutrunner having a housing (16) with an air inlet passage (11) and an air motor (12). The clutch mechanism includes a driving clutch half (22) with pockets (33) for two or more torque transferring balls (24), a bias spring (38), and an axially displaceable thrust element (34) for transferring the bias spring load to the balls (24), and a driven clutch half (23) having cam surfaces (25) for cooperation with the balls (24), wherein the driving clutch half (22) includes means (36, 44, 45) for feeding pressure air to the cylinder chamber (30), and the thrust element (34) has a cylindrical skirt portion (43) for sealing guidance in the cylinder chamber (30). A valve (44, 45, 48, 49) is arranged to accomplish a bias spring (38) compressing air force on the thrust element (34) as the latter has been initially displaced a certain distance by the balls (24) at release of the clutch.

13 Claims, 1 Drawing Sheet

TORQUE RESPONSIVE RELEASE CLUTCH MECHANISM

BACKGROUND OF THE INVENTION

The invention relates to a torque responsive release clutch mechanism intended for a pneumatic power nutrunner. In particular, the invention concerns a clutch mechanism comprising a driving clutch half connected to the nutrunner motor and being formed with pockets for two or more torque transferring balls, an axially acting bias spring, and an axially displaceable thrust element for transferring the load of the bias spring to the balls. The clutch mechanism also comprises a driven clutch half connected to the output shaft of the nutrunner and provided with cam surfaces for cooperation with the torque transferring balls.

A clutch mechanism of the above described type is previously disclosed in U.S. Pat. No. 5,129,465.

A problem concerned with clutches of the above type refers to the reengagement related torque impacts generated after release of the clutch at tightening of stiff screw joints, i.e. joints with a steep torque growth per unit angle of rotation. The reason is that when the desired maximum torque level is reached and the balls of the clutch pass over the top crests of the cam surfaces, the rotation speed is still high enough to cause the cam surfaces to reengage with the balls once or twice or more before the motor and the driving clutch half have stopped rotating, despite a timely motive air shut-off. Such torque impacts cause an undesirable overshoot of the installed torque beyond the desired torque level.

One way of solving this problem is to employ means for separating completely the clutch parts immediately after the clutch is released, thereby preventing the clutch from reengaging and generating undesirable torque impacts.

Examples of power nutrunners having clutch mechanisms provided with pneumatically actuated clutch separating means are disclosed in U.S. Pat. Nos. 2,683,512 and 3,487,901. Both of these prior art devices comprise pneumatic piston cylinder means associated with the driving clutch half and arranged to prolong the axial displacement of the driving clutch half after the attainment of the release point of the clutch. A feature common to these two devices is that the torque transferring engagement between the driving and driven clutch halves is determined by the air pressure acting on the piston-cylinder means. This makes the release torque level dependent on the air pressure, which is sometimes a drawback. Another feature common to these known devices is that the cylinder of the piston-cylinder means is formed as a nonrotating part of the tool housing and that the pressure air supply thereto requires extra space for internal passages through the tool housing or for external piping.

For cooperation with the nonrotating cylinder, the device shown in U.S. Pat. No. 2,683,512 comprises a rather primitive piston arrangement in which the piston forms a one-piece part of the driving clutch half. The disadvantages of this known clutch design are the occurence of friction forces and an undesirable wear of the piston and cylinder surfaces, which results in a poor function and a short service life of the clutch mechanism.

In the device shown in U.S. Pat. No. 3,487,901, the piston is rotatively journalled relative to the driving clutch half. This results in a more favourable interaction between the piston and the immovable cylinder. However, it also results in a rather complicated nutrunner design including extra ball bearings between the driving clutch half and the piston.

SUMMARY OF THE INVENTION

In contrast to the above described prior art devices, the clutch mechanism according to the invention provides a simple nutrunner design and a reliable operation with little frictional wear.

A torque responsive release clutch mechanism for a power nutrunner with a rotation motor and an output shaft, comprises a driving clutch half connected to the motor; a driven clutch half connected to the output shaft; at least two torque transferring balls; an axially displaceable thrust element; and an axially acting bias spring acting on the thrust element such that the thrust element is arranged to transfer a load of the bias spring onto the at least two balls. The driving clutch half includes at least two pockets for accommodating and transferring torque to the at least two balls, a cylinder chamber, and an air feed passage connecting the cylinder chamber to a pressure air source. The driven clutch half includes cam surfaces for cooperation with the at least two balls. The thrust element includes a ball facing side a bias spring facing side, and a cylindrical portion for sealing guidance in the cylinder chamber. The clutch mechanism further includes a first valve unit, arranged between the thrust element and the driving clutch half, which simultaneously connects the ball facing side and the spring facing side of the thrust element to the air feed passage to pressure balance the thrust element at transferred torque magnitudes below a release torque level of the clutch in order that an operating thrust force on the thrust element is determined by the bias spring, and a second valve unit, arranged between the thrust element and the driving clutch which depressurizes the bias spring facing side of the thrust element as the release torque level is attained when the element has been initially displaced a certain distance by the at least two balls at release of the clutch.

Other features and advantages of the invention appear from the following detailed specification and claims.

BRIEF DESCRIPTION OF THE DRAWINGS

A preferred embodiment of the invention is described below in detail with reference to the accompanying drawings.

In the drawings.

DESCRIPTION OF THE PREFERRED EMBODIMENTS

Figure 1:
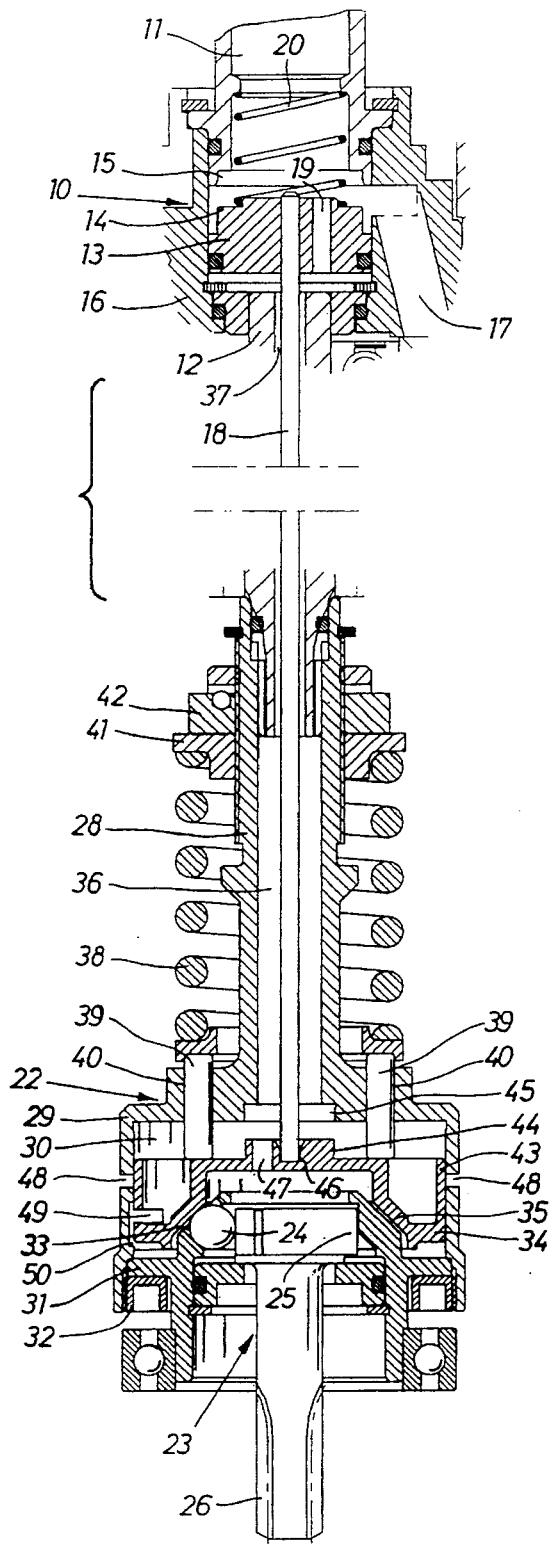
FIG. 1 shows a longitudinal section through a clutch mechanism according to the invention and illustrating the clutch in its torque transferring condition.

The clutch mechanism shown in the drawing figures is intended for a pneumatic nutrunner and cooperates with a motive air shut-off valve 10 located in the pressure air inlet passage 11 upstream of the nutrunner motor 12. The shut-off valve 10 comprises a valve element 13 having a shoulder 14 for sealing cooperation with a seat 15 in the nutrunner housing 16, thereby blocking an air feed passage 17 connected to the motor 12. The valve element 13 is attached to the rear end of an activating rod 18 and is provided with an axially extending through bore 19 for a continuous air supply to the clutch mechanism. A spring 20 acts on the valve element 13 in the opening direction of the latter.

The release clutch comprises a driving clutch half 22 drivingly coupled to the motor 12, a driven clutch half 23 connectable to the output shaft of the nutrunner (not shown), and a number of balls 24 for transferring torque between the clutch halves 22, 23.

At its rear end, the driven clutch half 23 is formed with a number of radially acting cam surfaces 25 for engaging the balls 24. At its forward end, the driven clutch half 23 is formed with gear teeth 26 for engaging a reduction gearing (not shown).

The driving clutch half 22 comprises a rear tubular portion 28, an enlarged front portion 29 including a cylinder chamber 30, and a forward end wall 31 secured to the front portion 29 by means of a threaded ring 32. The end wall 31 is formed with inclined pockets 33 for movably supporting the balls 24, and a thrust element 34, which is sealingly guided in the cylinder chamber 30 and formed with a conical contact surface 35 for engagement with the balls 24.

The tubular portion 28 defines a pressure air feed passage 36 which connects the cylinder chamber 30 to the air inlet passage 11 via a central axial passage 37 in the motor 12 and the bore 19 in the valve element 13.

The thrust element 34 is biassed forwardly into engagement with the balls 24 by means of a spring 38, and a number of push rods 39 extend into the cylinder chamber 30 via axial through bores 40 in the driving clutch half front portion 29. The spring 38 surrounds the rear tubular portion 28 of the driving clutch half 22 and takes support against a ring 41 and an adjustable nut assembly 42 which engages an external thread on the tubular portion 28.

Due to its disposition between the balls 24 and the bias spring 38, the thrust element 34 has a ball facing side and a spring facing side which are selectively pressurized as being described below.

The thrust element 34 is formed with a cylindrical skirt portion 43 for sealing guidance in the cylinder chamber 30 and a rear cylindrical neck portion 44 intended to be sealingly received in a matching socket portion 45 in the driving clutch half 22. The neck portion 44 and the socket portion 45 form a control opening means by which the pressure air supply to the spring facing side of the thrust element 34 is controlled.

The neck portion 44 has a central recess 46 for supporting the forward end of the activating rod 18. The neck portion 44 is also provided with one or more through openings 47 for communicating pressure air to the ball facing side of the thrust element 34.

The cylinder chamber 30 is provided with a number of part-circumferential slot shaped openings 48, and the skirt portion 43 of the thrust element 34 is likewise formed with part-circumferential slot like openings 49. These openings 48, 49 form a second pressure air control opening means by which the pressurization of the spring facing side of the thrust element 34 is controlled.

Moreover, the wall of the cylinder chamber 30 has a number of part-circumferential recesses 50 the purpose of which is to ensure pressure equalization between the spring facing side and the ball facing side of the thrust element 34 in the torque transferring condition of the clutch. See FIG. 1.

In operation, the nutrunner and its clutch mechanism are connected to a pressure air source, and pressure air is supplied to the shut-off valve 10 via a throttle valve (not shown) and the inlet passage 11. At the opposite end of the clutch mechanism, the driven clutch half 23 is connected to a screw joint to be tightened via a reduction gearing and an output shaft (not shown).

When starting a screw joint tightening process, the parts of the clutch mechanism occupy the positions illustrated in FIG. 1. This means that the shut-off valve 10 is open to feed pressure air to the motor 12 via passage 17 making the motor 12 start to deliver torque to the driving clutch half 22.

Simultaneously, pressure air is communicated through the bore 19 in the valve element 13, the motor passage 37 and the feed passage 36 to pressurize the cylinder chamber 30. Since the thrust element 34 occupies its forward position, the control opening means formed by the neck portion 44 and the socket portion 45 is open and pressure air enters the cylinder chamber 30 on the spring facing side of the thrust element 34. Pressure air also enters the cylinder chamber 30 on the opposite, ball facing side of the thrust element 34 through the openings 47 and also via the openings 49 in the thrust element skirt portion 43 and the recesses 50 in the cylinder chamber 30. In this position, the thrust element 34 is pressure balanced since the air pressure in the feed passage 36 acts on both sides of the thrust element 34.

The torque delivered by the motor 12 is transferred by the balls 24 from the driving clutch half 22 to the driven clutch half 23. The balls 24 are biassed against the cam surfaces 25 on the driven clutch half 23 by the spring 38 and the conical surface 35 on the thrust element 34. It is to be observed that the torque transferred by the clutch mechanism is limited to a certain level determined by the bias load of the spring 38 which is transferred to the thrust element 34 by the push rods 39. The spring load as well as the release torque level is determined by the setting of the adjustable nut assembly 42 which forms the spring support. The air pressure is of no significance at all for the release torque level of the clutch.

During the main part of the screw joint tightening process, the entire clutch mechanism rotates. As the torque resistance from the screw joint increases, the cam surfaces 25 of the driven clutch half 23 start urging the balls 24 outwards in their pockets 33, thereby pressing the thrust element 34 backwards against the bias load of the spring 38. As the desired final torque level is attained, the balls 24 have reached the top crests of the cam surfaces 25 and the transferred torque does not increase any further. At continued rotation of the driving clutch half 22 the balls 24 pass over these top crests and the clutch is released.

At the release point of the clutch, however, the thrust element 34 has been displaced backwards to a position where the neck portion 44 sealingly enters the socket portion 45 and the openings 49 in the skirt portion 43 begin to coincide with the openings 48 in the cylinder chamber 30. This results not only in that the pressure air supply to the spring facing side of the thrust element 34 is interrupted, but the upper part of the cylinder chamber 30 is depressurized by venting to the atmosphere. The ball facing side of the thrust element 34 on the other hand is still pressurized by the continuous pressure air supply through the openings 47.

From the very point where the neck portion 44 starts entering the socket portion 45 and the openings 48, 49 start coinciding, the pressure balance of the thrust element 34 is discontinued and an air force strong enough to further compress the spring 38 moves the thrust element 34 further backwards until the latter abuts against the upper end wall of the cylinder chamber 30. In this position, the conical contact surface 35 of the thrust element 34 has moved away from the balls 24 far enough to prevent the latter from reengaging the cam surfaces 25.

Figure 2:
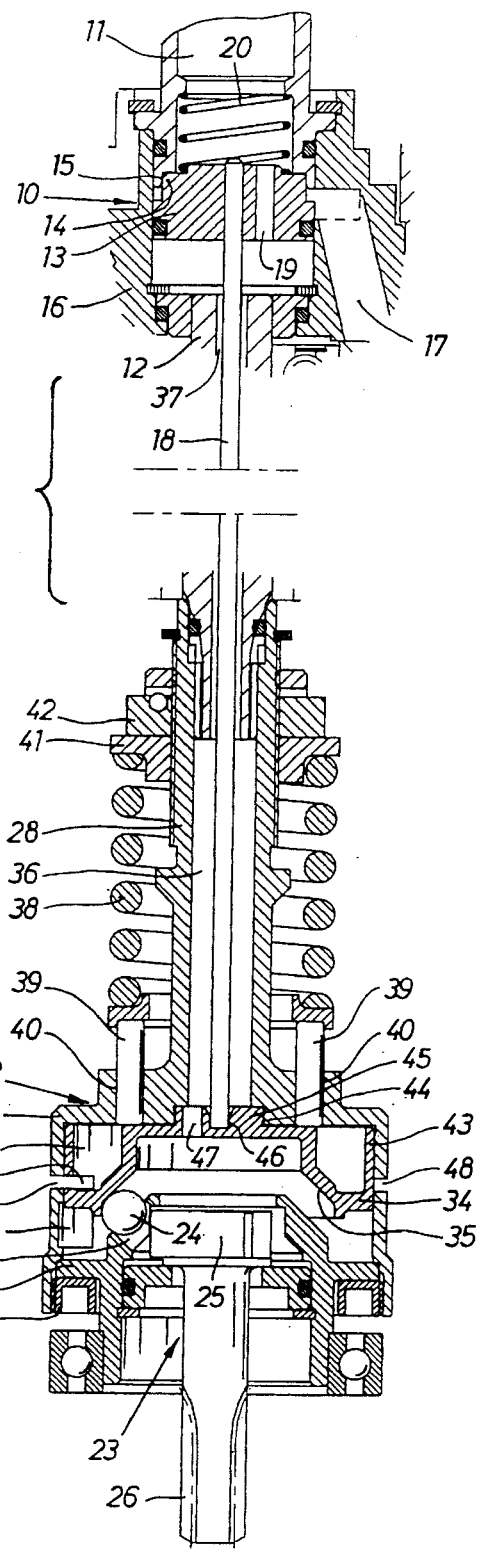
FIG. 2 is similar to FIG. 1 but illustrates the clutch mechanism in its released condition.

In this position, the clutch is fully released. See FIG. 2.

As the thrust element 34 is displaced to its disengaged position by air force, the activating rod 18 is moved backwards making the shut-off valve 10 close. Thereby, the air feed passage 17 to the motor 12 is blocked and the motor 12 stops rotating. It is to be noted that the bore 19 in the valve element 13 is still open to feed pressure air to the cylinder chamber 30, to thereby maintain the air force acting on the thrust element 34 towards the disengaged position.

This is an important feature of the clutch mechanism, because when tightening a very stiff screw joint, i.e. a screw joint having a steep torque growth per angle of rotation, the release torque level of the clutch is reached very abruptly at a high rotation speed of the rotating parts of the mechanism, and the kinetic energy of these parts would cause an extended rotation with one or more reengegements of the clutch balls 24 as a result. Since this would cause undesired post-release torque impulses, it is important that the clutch is maintained in its fully released position also after the closure of the motive air shut-off valve 10. Accordingly, the thrust element 34 is maintained in its retracted position as long as pressure air is supplied through the inlet passage 11 via the throttle valve (not shown).

When the throttle valve is closed, however, the air force acting on the thrust element 34 is discontinued, and the bias force exerted by the spring 38 will return the thrust element 34 to its forward ball engaging position. The first control opening means, formed by neck portion 44 and socket portion 45, is reopened and the second control opening means, formed by the slot openings 48, 49 in the cylinder chamber 30 and the skirt portion 43, respectively, is closed. The clutch mechanism is now reset to transfer torque up to a predetermined level. As the thrust element 34 is returned to its ball engaging position, the spring 20 shifts the shut-off valve 10 to open position. The motor 12 may now be started for another tightening cycle.

I claim:

1. A torque responsive release clutch mechanism for a power nutrunner with a rotation motor and an output shaft, the clutch mechanism comprising:
    a driving clutch half connected to said motor;
    a driven clutch half connected to said output shaft;
    at least two torque transferring balls;
    an axially displaceable thrust element;
    an axially acting bias spring acting on said thrust element such that said thrust element is arranged to transfer a load of said bias spring onto said at least two balls;
    said driving clutch half including:
        at least two pockets for accommodating and transferring torque to said at least two balls,
        a cylinder chamber, and
        an air feed passage connecting said cylinder chamber to a pressure air source;
    said driven clutch half including:
        cam surfaces for cooperation with said at least two balls;
    said thrust element including:
        a ball facing side,
        a bias spring facing side, and
        a cylindrical portion for sealing guidance in said cylinder chamber; and
    a valve unit arranged between said thrust element and said driving clutch half, said valve unit:
        simultaneously connecting the ball facing side and the spring facing side of said thrust element to said air feed passage to pressure balance said thrust element at transferred torque magnitudes below a release torque level of the clutch in order that an operating thrust force on said thrust element is determined by said bias spring, and
        depressurizing said bias spring facing side of said thrust element as said release torque level is attained when said element has been initially displaced a certain distance by said at least two balls at release of the clutch.

2. A clutch mechanism according to claim 1, wherein:
    said thrust element comprises a passage which continuously connects the ball facing side of said thrust element to said air feed passage; and
    said valve unit comprises:
        a first control opening assembly which connects, when open, the bias spring facing side of said thrust element to said air feed passage, and
        a second control opening assembly which connects, when open, the bias spring facing side of said thrust element to atmosphere,
        said first control opening assembly and said second control opening assembly being arranged to be open at different times.

3. A clutch mechanism according to claim 2, wherein:
    said thrust element comprises a cylindrical skirt portion for sealing cooperation with said cylinder chamber; and
    said second control opening assembly comprises:
        at least one part-circumferential slot in a wall of said cylinder chamber, and
        at least one part-circumferential slot disposed in said skirt portion so as to coincide with said slot in said cylinder chamber in the open condition of said second control opening assembly.

4. A clutch mechanism according to claim 3, wherein said bias spring is located outside said cylinder chamber, and a number of push rods extend into said cylinder chamber via through bores in said driving clutch half and are arranged to transfer the load of said bias spring onto said thrust element.

5. A clutch mechanism according to claim 4, wherein said thrust element forms an axial support for an activating rod extending axially through said driving clutch half and said motor and being connected to an air shut-off valve disposed in an pressure air inlet passage.

6. A clutch mechanism according to claim 3, wherein said thrust element forms an axial support for an activating rod extending axially through said driving clutch half and said motor and being connected to an air shut-off valve disposed in an pressure air inlet passage.

7. A clutch mechanism according to claim 2, wherein said bias spring is located outside said cylinder chamber, and a number of push rods extend into said cylinder chamber via through bores in said driving clutch half and are arranged to transfer the load of said bias spring onto said thrust element.

8. A clutch mechanism according to claim 7, wherein said thrust element forms an axial support for an activating rod extending axially through said driving clutch half and said motor and being connected to an air shut-off valve disposed in an pressure air inlet passage.

9. A clutch mechanism according to claim 2 wherein said thrust element forms an axial support for an activating rod extending axially through said driving clutch half and said motor and being connected to an air shut-off valve disposed in an pressure air inlet passage.

10. A clutch mechanism according to claim 1, wherein said bias spring is located outside said cylinder chamber, and a number of push rods extend into said cylinder chamber via through bores in said driving clutch half and are arranged to transfer the load of said bias spring onto said thrust element.

11. A clutch mechanism according to claim 10, wherein said thrust element forms an axial support for an activating rod extending axially through said driving clutch half and said motor and being connected to an air shut-off valve disposed in an pressure air inlet passage.

12. A clutch mechanism according to claim 1, wherein said thrust element forms an axial support for an activating rod extending axially through said driving clutch half and said motor and being connected to an air shut-off valve disposed in a pressure air inlet passage.

13. A torque responsive release clutch mechanism for a power nutrunner with a rotation motor and an output shaft, the clutch mechanism comprising:

a driving clutch half connected to said motor;

a driven clutch half connected to said output shaft;

at least two torque transferring balls;

an axially displaceable thrust element;

an axially acting bias spring acting on said thrust element such that said thrust element is arranged to transfer a load of said bias spring onto said at least two balls;

said driving clutch half including:

at least two pockets for accommodating and transferring torque to said at least two balls, a cylinder chamber, and an air feed passage connecting said cylinder chamber to a pressure air source;

said driven clutch half including:

cam surfaces for cooperation with said at least two balls;

said thrust element including:

a ball facing side, a bias spring facing side, and a cylindrical portion for sealing guidance in said cylinder chamber;

said bias spring is located outside of said cylinder chamber;

a number of push rods extending into said cylinder chamber via through bores in said driving clutch half and arranged to transfer the load of said bias spring onto said thrust element; and a valve unit arranged between said thrust element and said driving clutch half, said valve unit controlling application of pressure air on said thrust element to overcome a bias spring compressing force on said thrust element as the thrust element is initially displaced a certain distance by said at least two balls at release of the clutch.

\* \* \* \* \*